April 19, 1938.  E. W. BRINKMAN  2,114,626

METHOD AND APPARATUS FOR THREADING PIECES

Filed Dec. 30, 1935  6 Sheets-Sheet 2

INVENTOR
Earl W. Brinkman
BY D. Clyde Jones
his ATTORNEY

April 19, 1938.  E. W. BRINKMAN  2,114,626
METHOD AND APPARATUS FOR THREADING PIECES
Filed Dec. 30, 1935  6 Sheets-Sheet 3

INVENTOR
Earl W. Brinkman
BY D. Clyde Jones
his ATTORNEY

April 19, 1938.  E. W. BRINKMAN  2,114,626
METHOD AND APPARATUS FOR THREADING PIECES
Filed Dec. 30, 1935  6 Sheets-Sheet 5

INVENTOR
Earl W. Brinkman
BY D. Clyde Jones
his ATTORNEY

April 19, 1938. E. W. BRINKMAN 2,114,626
METHOD AND APPARATUS FOR THREADING PIECES
Filed Dec. 30, 1935 6 Sheets-Sheet 6

Patented Apr. 19, 1938

2,114,626

UNITED STATES PATENT OFFICE 2,114,626

METHOD AND APPARATUS FOR THREADING PIECES

Earl W. Brinkman, Rochester, N. Y., assignor to Davenport Machine Tool Co. Incorporated, Rochester, N. Y., a corporation of New York Application December 30, 1935, Serial No. 56,632

13 Claims. (Cl. 10—95)

The present invention relates to a method of and to mechanism for cutting threads and particularly to thread-cutting mechanism for automatic screw machines and to the operation of such mechanism.

The primary purpose of the present invention is to provide a method and mechanism for cutting a thread on a bar of stock beyond a shoulder or more generally to provide a method and mechanism for cutting a thread on a bar of stock beginning at a point removed from the projecting end of the bar.

A further object of the invention is to provide a threading mechanism which is simple in operation and inexpensive and which can be quickly and easily moved to and from operative position.

Other objects of the invention will be apparent hereinafter from the specification and from the recital of the appended claims.

In all previous threading dies and mechanism for threading work in screw or similar machines, it is only possible to cut a thread on the outer or projecting end of the work. If a self-opening die head is used, the chasers in the die head are closed to operative position before the die head comes into engagement with the work and the die head cuts from the projecting end of the work inwardly. With the present invention, it is possible to cut threads in a work-piece which do not begin at the projecting end of the work. Thus, for instance, it is possible with the present invention, to cut a helical oil groove in a shaft where it is essential that the groove should not extend to either end of the shaft. Moreover, it is possible to cut threads on both ends of a work-piece in a single chucking as, for instance, on both ends of the well-known cylinder-head stud or on both ends of a nipple or stud that has a shoulder or collar intermediate its ends which is larger in diameter than its threaded portions, etc.

Two different embodiments of the invention have been illustrated in the accompanying drawings in which.

In the threading mechanism illustrated in the drawings, the threading tool comprises a die head provided with a plurality of chasers. These chasers are mounted to be radially movable in the die head but the die head might be of any other known or suitable type. It might have tangentially movable chasers, rotatably movable chasers, etc. The die head is secured to a rotatable and axially reciprocable tool spindle. The tool spindle may form one of the tool spindles of an automatic screw machine or other machine on which the mechanism of the present invention is used. The tool spindle is reciprocated to move the die head to and from operative position and to effect, in conjunction with the rotary movement of the spindle, threading of the work when the chasers are in operative position.

The chasers are normally held open in inoperative position by springs and are moved to operative position by sliding an actuating sleeve axially on the tool head. The actuating sleeve is designed to cooperate with conical cam surfaces formed on the chaser members or blocks or slides carrying the chasers so that when the sleeve is moved axially forward on the tool head, the chaser members are forced radially inwardly to operative position and when the sleeve is moved rearwardly, the chaser members are released.

The sleeve is reciprocated axially by a yoke member that is operated by a sliding bar. The reciprocating movements of the tool spindle and of the sliding bar are controlled by a rotary cam through a pivoted lever to which both are connected. The sliding bar is connected to the free end of the lever while the tool spindle is connected to the lever between the point of its connection with the bar and its pivotal center. Thus in either direction of movement of the lever, the sliding bar moves faster than the tool spindle. This relative movement between the sliding bar and the tool spindle is used to effect movement of the actuating sleeve relative to the tool head to cause the movement of the chasers to and from operative position.

In one embodiment of my invention, the axial movement of the tool spindle is reversed when the chasers have been moved into operative position and the work is threaded during the reverse movement of the tool spindle. In this embodiment of the invention, the sliding bar carries a pair of spaced trip lugs for moving the yoke member and the distance between these lugs determinates the time the chasers are in operation.

In the other illustrated embodiment of the invention, the chasers cut during their forward movement and are moved to operative position by operation of the sliding bar but are released by operation of a fixed stop with which the yoke member comes into contact when the work has been threaded the desired distance.

In either embodiment of the invention, the threading tool does not become operative until the chasers have been moved radially inwardly in the tool head into engagement with the bar of stock. While the chasers are in open position, the tool head can be moved beyond a shoulder or any distance along the bar of stock and when the chasers are closed, then the threading operation can begin beyond the shoulder or at the desired distance from the end of the bar. Thus with the mechanism of the present invention a thread may be cut into a bar of stock beginning at any point desired along the bar.

Referring now to the drawings by numerals of reference, 20 designates the rotating head and 21 one of the work spindles of an automatic screw machine. 24 denotes one of the tool spindles of this machine, a threading spindle. The other work spindles and tool spindles of the machine have not been shown because they form no part of the present invention and may be of standard construction. In fact, the machine, with the exception of the one tool spindle shown and the mechanism for operating same, may be of any known construction.

The tool spindle 24 is journaled in the tool carrier 25 of the machine on a front spindle box or bearing 26 and in an anti-friction bearing 100 to which further reference will be made hereinafter. The tool spindle is both rotatable and slidable in the bearing 26.

A tool-head 28 is secured to the forward end of the tool spindle 24 by a set screw 135. This tool head is provided with a central bore or opening 34 to provide room for the projecting end of the bar of stock being threaded to pass into the head during the threading of the bar.

A plurality of chasers 30, or chaser carrying slides or the like are mounted on the forward face of the tool head in angularly spaced relation. In the embodiment shown, there are four of these chasers spaced 90° apart, which slide in ways 29 formed in the tool head and are movable in these ways radially of the axis of the head and its bore 34.

The chasers 30 are normally spring pressed outwardly to their open, or inoperative position by coil-springs 31 which are mounted in radial recesses 32 formed in the tool head and which engage the stems of pins 33 that are secured in the chasers 30. A cover plate 35, which is secured to the head 28 by screws 36 (Fig. 5) serves to hold the chasers within the head.

Each of the chasers is provided with a threaded cutting surface 37 and together these thread chasers constitute, when closed, the novel thread cutting tool of the present invention.

The head 28 is formed on its periphery with cylindrical bearing surfaces 41 and 42, providing guide surfaces on which a sleeve or actuating member 40 moves. A hardened ring 48 is adjustably secured to this sleeve or actuating member.

The chasers 30 are formed at their outside extremities with spaced rounded surfaces 45 and 46 which are connected by a beveled or conical surface 47. The ring 48 is adapted to be moved back and forth on the head 28 on reciprocation of the sleeve 40. When the sleeve 40 is moved forwardly on the head 28 from the position shown in Fig. 3 to the position shown in Fig. 4, the ring 48 is adapted to ride up on the conical surfaces 47 of the chasers 30 or the like to close them against the resistance of the springs 31 and thus move the chasers to operative position. When the sleeve is moved rearwardly again, the chasers are opened by action of the springs 31.

Figures 5, 8, 9, 10:
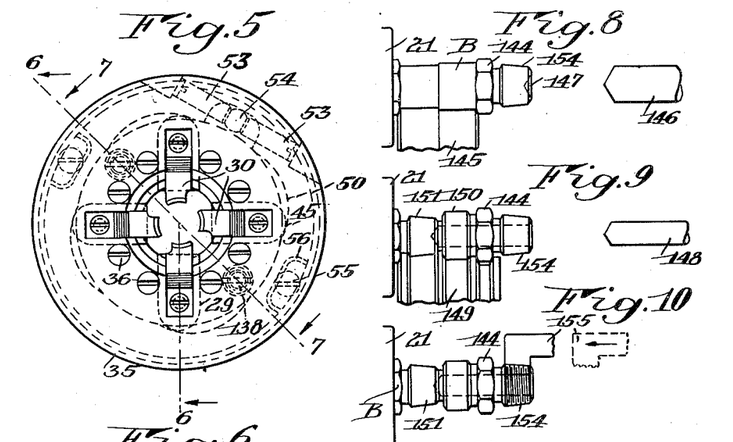
Fig. 5 is a front elevation of the threading tool.
Figs. 8 to 12 inclusive are diagrammatic views illustrating one method of successively forming, drilling and threading both ends of a shouldered nipple on an automatic screw machine provided with a threading attachment constructed according to the present invention.
Figure 6:
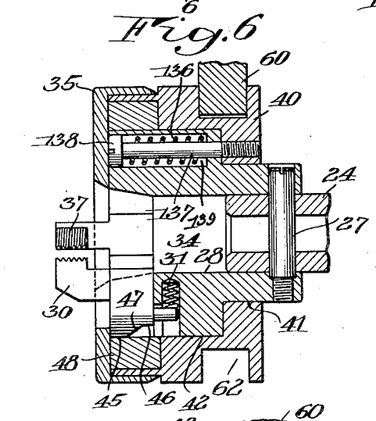
Fig. 6 is a section on the line 6—6 of Fig. 5.
Figure 7:
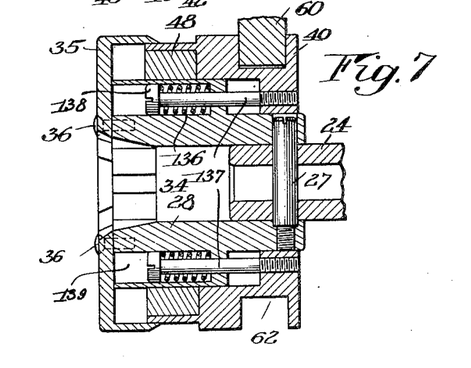
Fig. 7 is a section on the line 7—7 of Fig. 5.
Figure 11:
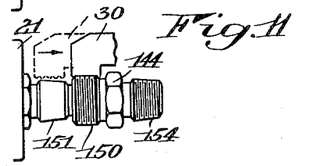
Figure 12:
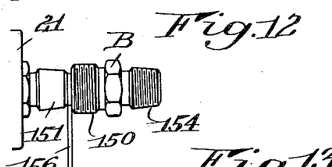

To permit of adjustment of the chasers to compensate for wear or for depth of cut, the ring 48 may be formed as shown in Fig. 5 with angularly spaced internal cam surfaces 50 and may take its bearing only at spaced points on the surfaces 45, 46 and 47. The cam surfaces 50 may simply be arcuate surfaces eccentric of the axis of the tool head. Through provision of these cam surfaces, however, the positions of the chasers can be controlled, for by rotating the ring 48 in the tool head in one direction or the other, the radial positions of the chasers can be varied.

The ring 48 is adjusted angularly in the tool head by adjustment of the screws 53 which thread into recesses formed in the ring and which engage with opposite sides of a pin 54 that is secured in the tool head. The ring 48 is secured in any position of its angular adjustment on the tool head by screws 55 which pass through arcuate slots 56 formed in the ring and which thread into the tool head.

The actuating member or sleeve 40 is moved axially by a yoke-member 60 which engages in a groove 62 formed in the sleeve 40 and which is slidably mounted upon a guide rod 63. The guide rod is mounted in a socket 64 that is secured to the frame or other stationary part of the machine and is secured in this socket by the set-screw 65.

The yoke 60 is operated by a sliding bar 70 which is operated by a cam 71 through the medium of a lever 72. The cam is keyed to a sleeve 73 which is journaled on a stud 74 in the tool carrier. The lever 72 is pivoted on a pin 76 mounted in a bracket 77 which is secured to the tool carrier. At one end, the lever 72 carries a roller 78 which engages in the track 79 of the cam 71. At its other end, the lever is pivotally connected by the pin 81 to a turn-buckle 80 which in turn is pivotally connected to the sliding bar 70.

The bar 70 slides on a pin 82 which is secured in the split clamping jaw 83 of a block 84. This block is mounted on a plate 86 that is secured by screws 87 to the cap-plates 88 of the tool-carrier. The block 84 is adjustable longitudinally on the plate 86 in a direction axial of the tool spindle 24 and is secured in any adjusted position on the plate 86 by bolts 85 which pass through elongated slots 89 in the block and which thread into the plate.

The lower surface of the bar 70 which slides on the pin 82 is recessed at 91 for a purpose which will hereinafter appear. At its forward end, the lower surface of the bar is recessed to provide a shoulder 92. Adjustably mounted upon the bar is a hooked member or dog 95. In the movements back and forth of the bar 70 under actuation of the cam 71 and lever 72, the shoulder 92 and dog 95 are adapted to engage alternately with a hardened block 93 that is secured by screws 94 to the yoke member 60. Thus the yoke member is moved alternately in opposite directions on the rod 63 to move the sleeve 40 and ring 48 alternately in opposite directions to open and close the chasers 30.

The extent of movement of the bar 70 between reversals of the yoke member 60 is determined by the distance between the opposed faces of the shoulder 92 and dog 95. The dog 95 is adjustable on the bar to determine this distance and is secured in any adjusted position by the bolts 96 which pass through the elongated slot 97 in the long arm of the dog and thread into the bar 70.

For the threading operation and for axial movement of the chasers to and from operative position, the tool spindle 24 is moved axially. The tool spindle is of reduced diameter at its rear end and is journaled in a thrust bearing 100 and a bushing 101 in a sleeve or quill 102. The bearing 100 and bushing 101 are held in axial position with the bearing 100 abutting against the shoulder 104 of the tool spindle by the nuts 105 and 106 which thread on the spindle.

The sleeve or quill 102 is slidable in a bearing 107 that is secured in the tool carrier by a nut 109. This nut threads on the bearing and causes a shoulder formed on the bearing to abut against the tool carrier.

The sleeve 102 is hollow and houses a bushing or plunger 110 which is pivotally connected by the pin 111 with the turnbuckle 113. The turnbuckle, in turn, is pivotally connected by the pin 114 to an arcuate block 115. Block 115 is formed with a convex guide surface and is angularly adjustable upon a concave seat 116 formed on the lever 72. Block 115 is secured in any adjusted position by bolts 117 which pass through the block 115 and have their heads engaging in the arcuate slot 119 formed in the seat-portion 116 of the lever.

The plunger 110 is hollowed out at its inner or forward end to receive a block 120 and a coil spring 124. The block is pinned to the sleeve or quill 102 by a pin 121 and the pin is held in the block by the set-screw 122. The spring 124 is interposed between the opposed faces of the block and of the recess in the plunger 110 in which the spring is housed. To permit relative axial movement between the plunger 110 and the block 120, the plunger is slotted as indicated at 125 for the passage of the pin. The block 120 and forward wall of the plunger 110 are also slotted at intervals around their respective peripheries to telescope one on the other. The slots in the block are indicated at 126 in Fig. 1 and the slots in the wall of the plunger at 127. The slot 125 is closed at both ends.

During the latter part of the movement of the lever 72 in a counterclockwise direction, the nut 130 comes in contact with the stop screw 131 and stops the axial movement of the spindle carrying the chasers. The lever, however, continuing to move, compresses the spring 124 while the sliding member 70, having come in contact at the points 92 and 93, moves the sleeve 40 forward, bringing the chasers 30 into the operative position as shown in the Figure 4. In the reverse movement of the lever 72, the plunger 110 moves to the right independently of the quill until the pin 121 bottoms in the left hand end of the slot 125. Then the tool spindle is carried on to the right, bringing the chasers in contact with the work.

The sleeve 40 is normally urged to operative position by the springs 136 surrounding the pins 137 which are threaded into the sleeve. These springs are housed in recesses 139 formed in the head 28 and are interposed between the heads 138 of these pins and the bottoms of the recesses 139, so that they apply a spring pressure on the chaser members, when closed, to hold them under tension during the cut.

The tool spindle 24 is rotated for cutting by a gear 140 which has a splined connection with the spindle and which is driven by the gear 141 from any suitable source of power within the machine. The gear 140 is mounted between the bearing members 26 and 107. The bearing member 26 is held in position in the tool carrier by the nut 142.

To illustrate the purpose of the present invention, reference is had to Figs. 8 to 12 inclusive wherein are shown typical steps in the production of a nipple that is threaded on both ends upon an automatic screw machine equipped with a threading mechanism constructed according to the present invention.

Figure 13:
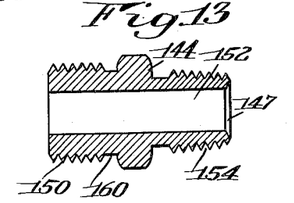
Fig. 13 is a sectional view of the finished nipple.

B denotes a bar or rod of stock provided at intervals with hexagonally shaped shoulders or gripping portions 144. From this bar or rod of stock are to be made nipples such as shown at 160 in Fig. 13.

A typical first operation upon the automatic screw machine would be to form cut the bar and drill it with the forming tool 145 and drill 146, respectively, as shown in Fig. 8. The forming tool rough-shapes the projecting portion of the bar beyond the shoulder 144 and the drill 146 forms the centering recess 147.

When these operations have been completed by known tools operating in known manner, the rotating head of the machine is indexed to bring the work into registry with a second set of tools. A typical second operation would be to finish-form the projecting part of the bar or rod with the forming tool 149 and drill it for the length of a nipple with the drill 148. These tools may be of known form and operated in known manner. The forming tool 149 will form the cylindrical portion 150 of the nipple and the conical portion 151 of what is to be the next nipple. The drill 148 produces the hole 152.

When these operations have been completed, the rotating head 20 of the machine is again indexed to bring the work into operative relation with another tooling mechanism. A typical third operation would be to thread the conical surface 154 previously formed on the projecting end of the bar. This operation may be accomplished in the usual manner with a standard chaser 155 that is moved axially of the stock-rod, as indicated by the arrow in Fig. 10 and simultaneously rotated in engagement therewith. The dotted lines show the position of the chaser before it engages the work and the same chaser is shown in full lines in engagement with the work.

When this operation has been completed, the rotating head 20 is again indexed to bring the work into registry with a different set of tools. The typical fourth operation would be to thread the cylindrical portion 150 with the threading mechanism of the present invention. The chasers 30 are moved to the left beyond the cylindrical portion 150, then closed together and then reversed and moved to the right as indicated by the arrow in Fig. 11, the threading of the portion 150 of nipple being accomplished during rightward movement of the chasers.

The final typical operation is to cut the completed workpiece off of the bar or rod. This is accomplished by again indexing the rotating head 20 to bring the bar or rod into operative relation with the cut-off tool 156 and then actuating this tool in known manner to effect the cutting-off operation and produce the finished product, the nipple 160 shown in Fig. 13.

The operation of the threading mechanism of the present invention will be understood from the preceding description but may be briefly summed up here.

Figures 1, 3:
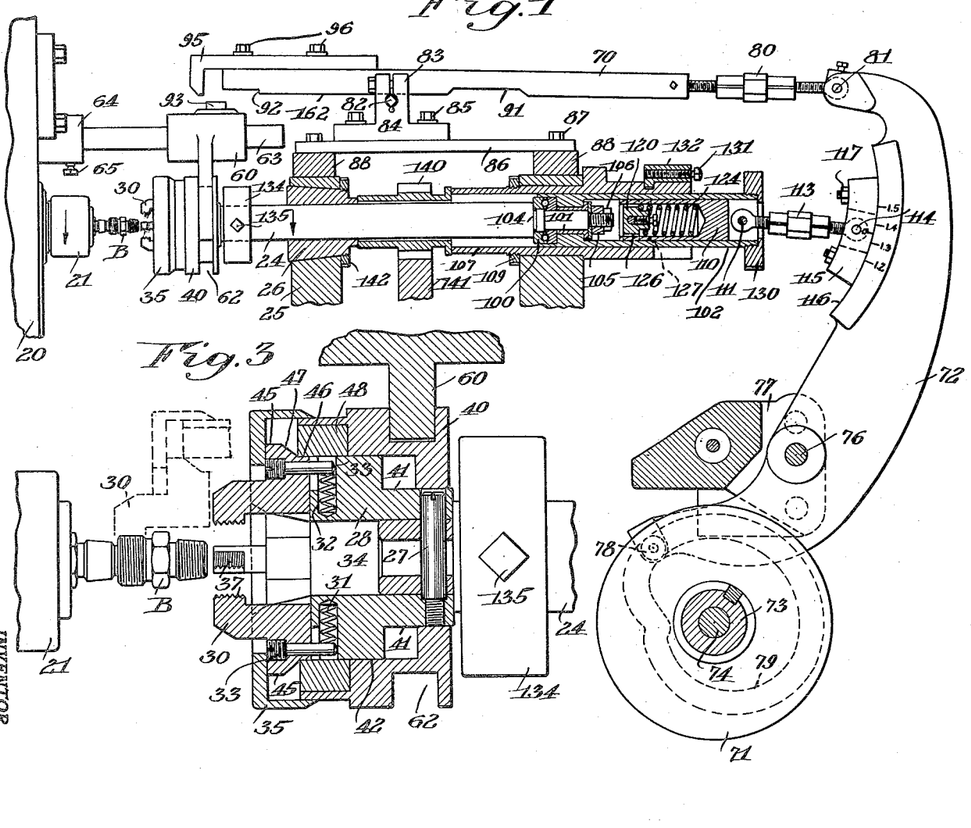
Fig. 1 is a view partly in section, showing a threading mechanism for an automatic screw machine constructed according to one embodiment of the present invention and showing the threading tools, tool spindle and associated parts in inoperative position.
Figs. 3 and 4 are enlarged sectional views of the chasers and their operating jaws and showing them respectively in open or inoperative position and in closed or operative position.
Figures 2, 4:
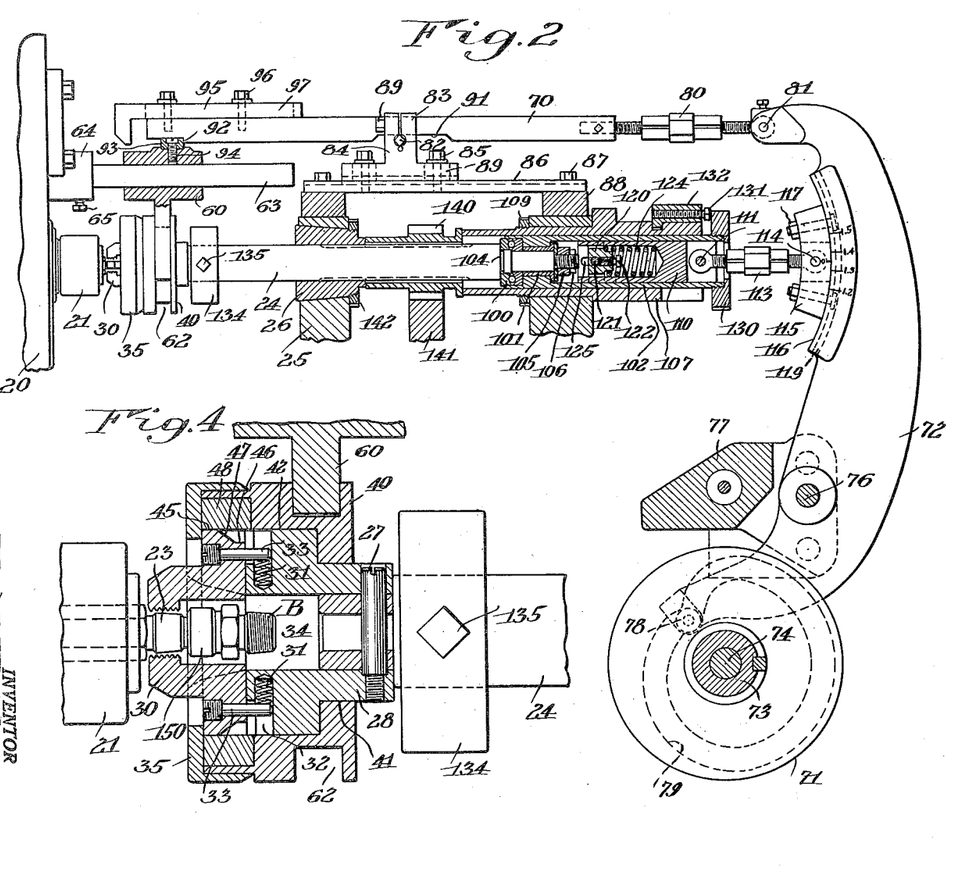
Fig. 2 is a similar view but showing the parts in operative position.

Fig. 1 shows the parts in inoperative position with the tool spindle withdrawn from operative position and with the dog 95 swung upwardly out of engagement with the block 93 and with the flat bottom surface 162 of the bar 70 resting on the pin 82. As the cam 71 rotates in the clockwise direction, the lever 72 will be rocked counter-clockwise about its pivot. This will move the bar 70 to the left and will cause the plunger 110 to move the tool spindle 24 to the left, as already described. When the tool spindle has moved to the left until the collar 130 engages the stop 131, the continued movement of the plunger toward the left, compresses the spring 124.

The bar 70 will move faster to the left than the tool spindle as the bar is connected to the outer end of the lever 72, but by properly adjusting the block 115 on the lever 72 and properly adjusting the block 84 along the plate 86, the tool head will be moved far enough to the left to insure that the chasers will have passed beyond the cylindrical portion 150 of the rod of stock before they are closed. When the flat surface 162 rides off the pin 82 and the pin drops into the recess 91 in the bar, the shoulder 92 formed on the bar 70 will be in operative position and in the further travel of the bar to the left will engage the block 93 and move the yoke-member 60 on the rod 63. Since the bar 70 is, as described, moving faster than the tool spindle, this will cause the ring 48 to ride up on the conical surfaces 47 of the chaser jaws 30 onto the rounded surfaces 45 of the jaws. This will force the jaws together to operative position against the resistance of the springs 31 and so the jaws will be closed. They will now occupy the position shown in Fig. 4.

Now the cam 71 will reverse the lever 72. The bar 70 will start moving to the right and when the plunger has moved far enough for the pin 121 to bottom in the righthand end of the slot 125, the tool spindle will move to the right also. This movement will bring the now closed chasers into engagement with the cylindrical surface 150 of the work and since the tool spindle and chasers are being rotated about the axis of the tool spindle as the spindle moves axially, the chasers will turn a thread in the cylindrical portion 150. As a result of the cutting of this thread, the chasers and the tool spindle are advanced to the right faster than the plunger 110 so that the spring 124 is compressed. The gears 141 and 140 will have been so selected as to impart the required rotary movement to the tool spindle as it moves axially.

The threading movement of the chasers will continue until the dog 95 engages the block 93. Then due to the relative movement between the bar 70 and the tool spindle, the yoke member 60 will be moved to shift the ring 48 to the right on the tool head. This will cause the springs 31 to release the chasers out of engagement with the work. When the chasers are released from the work, the compressed spring 124 forces the tool spindle 17 and the chaser slightly to the left so that the chasers can open completely and thereby pass over the shoulder on the work.

As soon as this has happened, the flat surface 162 of the bar 70 will ride up on the pin 82 and the bar will be swung upwardly to the inoperative position shown in Fig. 1. The rightward movement of bar and tool spindle will continue, however, until the chasers have been moved clear of the end of the rod of stock as shown in Fig. 1. Then the rotating head 20 will be indexed to permit cutting off the completed piece and the threading mechanism will begin work anew on a new piece.

The modification of the invention shown in Figs. 14 to 21 inclusive is very similar in construction and operation to the embodiment already described. Like parts will be designated by the same reference numerals as already used.

Here both the tool spindle 170 and the sliding bar 171 are connected to the adjustable block 172 by turnbuckles 174 and 175 respectively. The block 172 is similar to the block 115 and is formed with a convex surface 176 that is adjustable upon the concave seat 177 formed on the lever 178. The block 172 is secured to the lever in any adjusted position by any suitable means as by bolts.

The bar 171 is somewhat differently shaped from the bar 70. It has a flat portion 179 on its lower face which adjoins a recess 180 and this recess adjoins an upwardly sloping surface 181. Adjacent its lefthand end the bar is formed with a shoulder 182. The bar rides on a pin 82 mounted in a block 84.

The tool head is identical in construction with that already described except that the chaser members 185 are provided simply with a plurality of cutting teeth 186. The yoke member 187 slides on a splined rod 188 which is secured to the frame or other fixed part of the machine. Mounted on this rod 188 is a stop 190 which is adjustable on the rod and is held in any adjusted position by the set-screw 191.

Figures 14, 15:
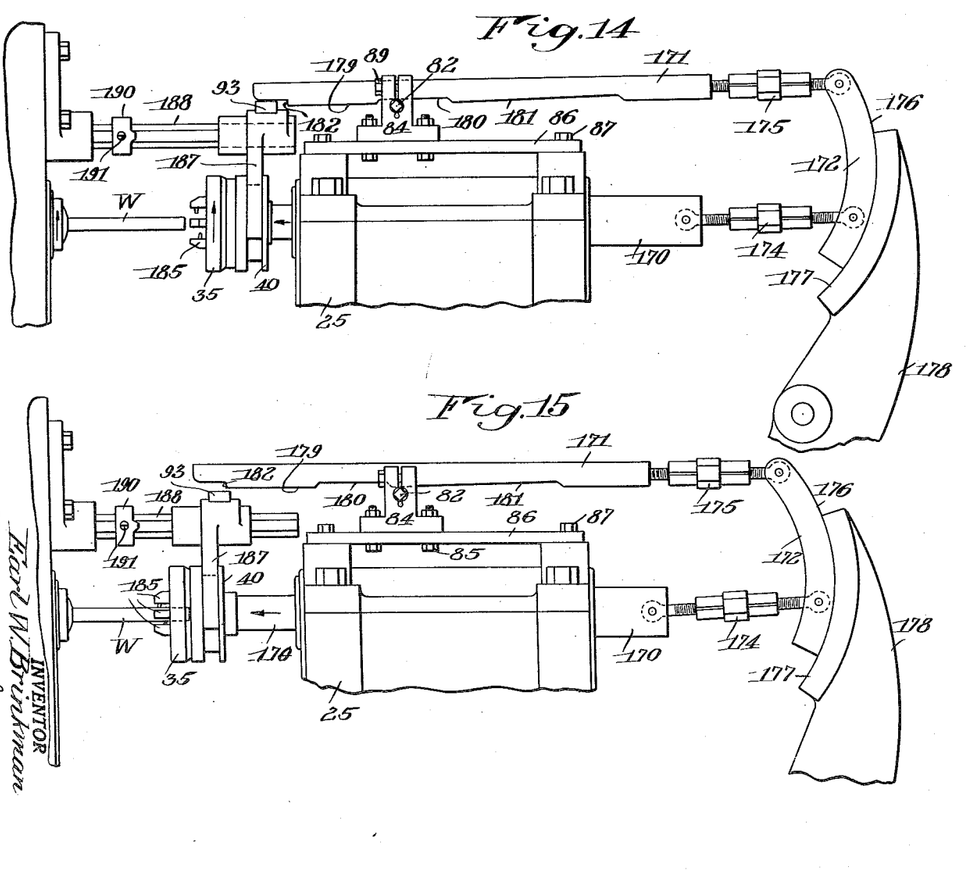
Figs. 14 to 17 inclusive are views of a threading attachment constructed according to a somewhat different embodiment of the invention and illustrating successive steps in the operation of this mechanism.
Figure 18:
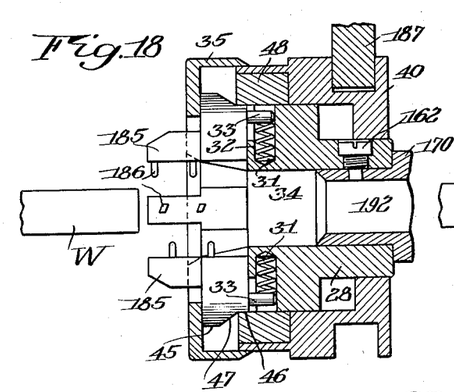
Figs. 18 to 21 inclusive are sectional views of the threading tool of this modified form of threading mechanism and showing different positions of the tool and work at successive stages in the threading of a spindle whose thread is to begin at a point remote from the projecting end of the bar of stock from which the spindle is to be cut.
Figure 19:
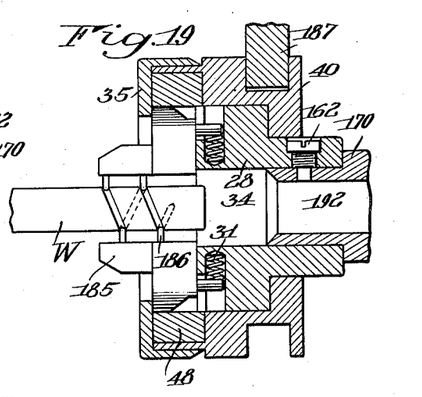

The operation of the modified form of the invention will be apparent from the figures. W indicates the rod of stock being operated upon. Figs. 14 and 18 show the parts in inoperative position. As the lever 178 moves counterclockwise, the open chaser jaws are moved over the rod W and the bar 171 also moves to the left but at a faster rate than the tool spindle. When the pin 82 drops into the recess 180 in the bar, the shoulder 182 on the bar will drop into operative position and when this shoulder strikes the block 93 carried by the yoke member 187, the actuating member 40 and ring 48 will be moved on the tool head 28 to close the chaser members 185 on the rod W at a point spaced from the projecting end of the rod. This is shown in Figs. 18 and 19.

The rotating and axially moving threading tools will then turn a thread 191 in the rod W which begins at a point spaced from the projecting end of the rod. As soon as the chasers have been moved into operative position, the pin 82 will ride out of the recess 180 and onto the sloping surface 181 of the bar 171. This will swing the bar upwardly out of operative position as shown in Fig. 16.

Figure 20:
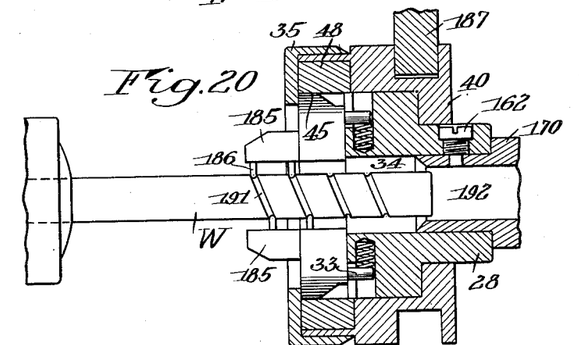

The chasers will continue rotating and moving to the left as shown in Fig. 20 until the yoke member 187 strikes the stop 190. Then the ring 48 will be moved rearwardly, that is, to the right of the leftward traveling tool head 28. This will release the chaser jaws and the jaws will be opened by the springs 31.

Figures 16, 17:
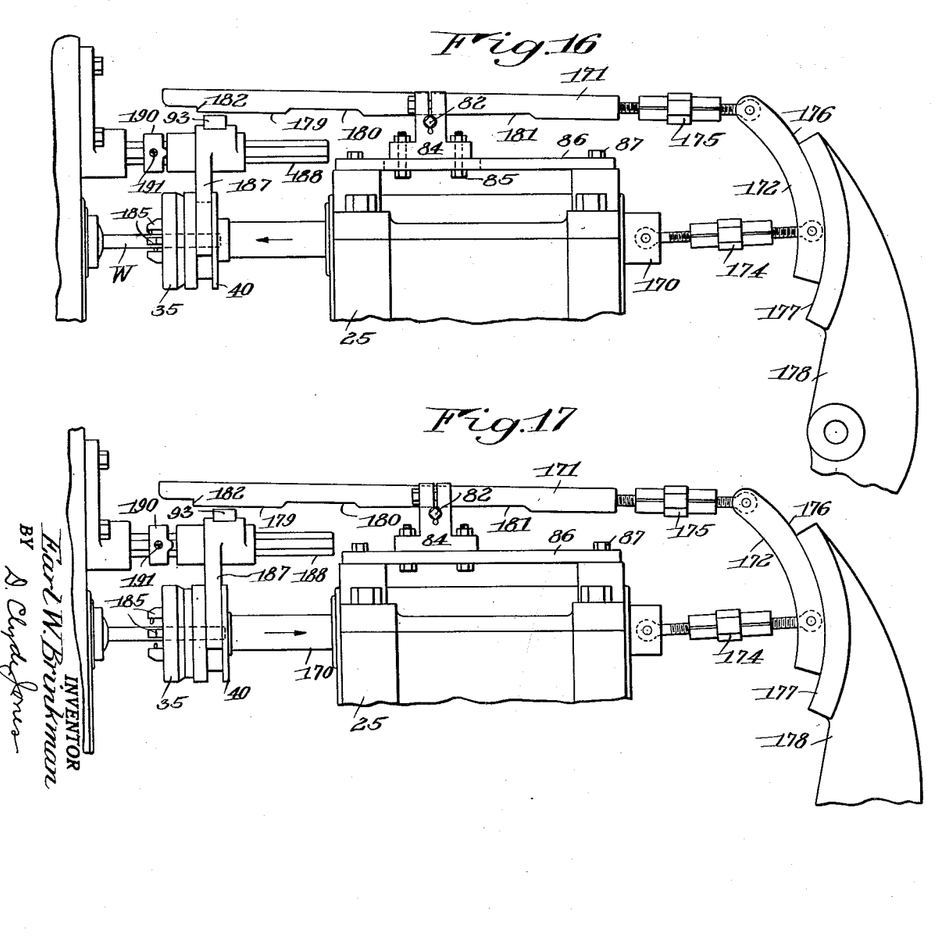
Figure 21:
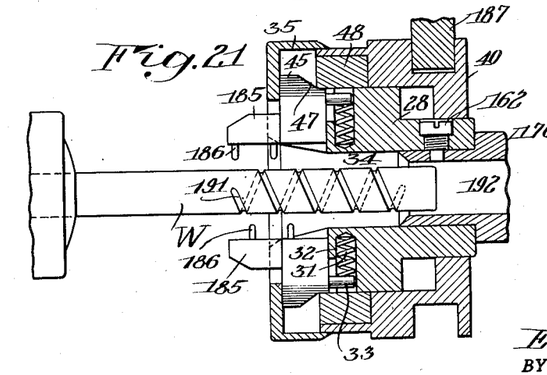
Figure 22:
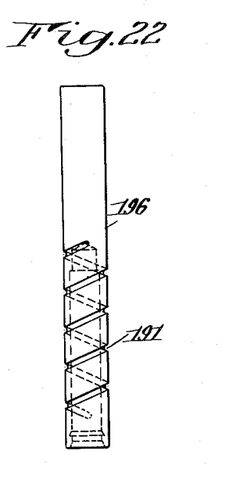
Fig. 22 is an elevation of the finished spindle.

Then the direction of movement of the bar 171 and tool spindle 170 will be reversed by the lever 178 and the bar and the tool spindle will be returned to the right as shown in Fig. 17. The positions of the chasers as soon as they are released are shown in Fig. 21.

As soon as the chasers have cleared the right-hand end of the rod of stock W, the rotating head 20 may be indexed to move the rod to the cutting-off station where the finished part 196 is cut off and to bring a new rod into registry with the threading tools.

It will be noted that the bore 34 of the tool head 28 and bore 192 of the tool spindle 170 in the embodiment last described will be of sufficient diameter to permit the rod W to pass into the same far enough to permit threading the rod for the desired length.

In both forms of the invention illustrated, the chasers are shown as cutting directly into the solid bar of stock. It will be understood however, that the chasers might operate instead in a groove previously formed in the work. It will further be understood that while mechanism has been disclosed in which axial and rotary movement is imparted to the die head, the head might instead remain stationary and the threading be accomplished wholly by rotating and feeding the work through the chasers.

Altho the invention has been disclosed in an arrangement for externally threading pieces, it is also adaptable for internally threading hollow parts or tubes.

In general, it may be said that while two different embodiments of the invention have been described, it will be understood that the invention is capable of further modification. This application is intended to cover any variations, uses or adaptations of the invention, which may occur to those skilled in the art to which the invention pertains and which may come within the scope of the invention and the limits of the appended claims.

What I claim is:

1. The method of cutting threads on both ends of a nipple or the like which has a shoulder intermediate its ends, comprising gripping one end of the work in a chuck, bringing the work into registry with a threading tool and threading the end of the work which projects beyond the shoulder in the usual manner of threading a nipple or the like, then bringing the work into registry with a die-head provided with chasers which are movable to and from operative position, moving the die head over the projecting end of the work and beyond the shoulder while the chasers are in inoperative position, then moving the chasers to operative position and producing simultaneous relative rotation and longitudinal movement between the chasers and work to effect the threading of the part beyond the shoulder in a direction toward the shoulder.

2. The method of threading a rod or the like which is provided with a shoulder intermediate its ends, which comprises gripping one end of the work in a chuck, producing relative rotary and longitudinal movement between the work and a die-head provided with chasers, while maintaining the chasers in inoperative position until the chasers have passed beyond the shoulder to a point beyond that to which the thread is to extend, then moving the chasers to operative position and reversing the direction of the relative longitudinal movement while continuing the rotary movement to effect the threading operation in a direction toward the projecting end of the rod.

3. In a threading mechanism, a reciprocable tool head, a plurality of chasers mounted in the head in angularly spaced relation for movement to and from operative position, a slidable member reciprocable in parallelism with the head, spaced members secured to the slidable member and adapted on movement of the slidable member in opposite directions, respectively, to move the chasers to and from operative position, a pivoted lever pivotally connected to the slidable member and to the head at points spaced, respectively, different distances from the pivot of said lever, and means for rocking said lever alternately in opposite directions about its pivot.

4. The method of threading a work-piece which is provided with a shoulder intermediate its ends, comprising securing a work-piece in a chuck with one end projecting outwardly beyond the chuck, producing a relative rotary movement between the work-piece and a die-head, which is provided with chasers, and moving the die-head longitudinally of the work, while maintaining the chasers in inoperative position until the chasers have passed beyond the projecting end and the shoulder of the work-piece, then moving the chasers to operative position and reversing the longitudinal movement of the die-head while continuing the relative rotary movement to effect the threading operation toward the shoulder.

5. The method of threading a rod or the like which is provided with a shoulder intermediate its ends, which comprises gripping one end of the work in a chuck, moving a die-head which is provided with chasers over the projecting end of the work and longitudinally along the work, while maintaining the chasers in inoperative position, until the chasers have passed beyond the shoulder, then moving the chasers to operative position and then moving the chasers longitudinally of the work in the reverse direction while effecting relative rotary movement between the chasers and the work to thread the work toward said shoulder.

6. In a threading machine, a work holder, a rotary tool spindle mounted in axial alignment with the work holder, a self-opening die secured at the end of the tool spindle which is adjacent the work holder, means for moving the tool spindle axially to move the die toward and from the work and along the same, and means controlling the operation of the die so that the die is not closed until after it has passed beyond the projecting end of the work-piece carried by the work-holder.

7. In a threading machine, a work holder, a rotary tool spindle mounted in axial alignment with the work holder, a self-opening die secured at the end of the tool spindle which is adjacent the work holder, means for moving the tool spindle axially to move the die toward and from the work and along the same, and means for controlling the operation of the die so that the die is not closed until after it has passed beyond the projecting end of the work-piece carried by the work holder, and said means for moving the tool spindle being operative immediately after the die is closed to reverse the direction of movement of the spindle to cause the die to thread the work toward the projecting end thereof.

8. In a threading machine, a rotary work holder, a rotary tool spindle, a self-opening die secured at the end of the tool spindle which is adjacent the work holder, means for moving the tool spindle axially to move the die toward and from the work and along the same, a member movable axially of the tool spindle and relative to the same to close said die, and means movable relative to said tool spindle for controlling the movement of said member so that the die is not closed until it has passed beyond the projecting end of the work-piece carried by the holder.

9. In a threading machine, a rotary work-holder, a rotary tool spindle, a self-opening die secured at the end of the tool spindle which is adjacent the work-holder, a lever pivotally connected to the tool spindle at its opposite end, a slidable yoke for operating the die, a rod mounted for movement parallel to the tool spindle, means carried by said rod for shifting said yoke on movement of said rod relative to the tool spindle, means connecting said rod to said lever at a point different from the point of connection of the lever with the tool spindle, and means for rocking said lever to effect axial movement of the lever and operation of said die.

10. In a threading machine, a rotary work-holder, a rotary tool spindle mounted in axial alignment with the work-holder, a self-opening die secured at the end of the tool spindle which is adjacent to the work-holder, a pivoted lever pivotally connected to the tool spindle at its opposite end, a slidable yoke for operating the die, a rod mounted for movement parallel to the direction of movement of the tool spindle and independently thereof, means connecting said rod to said lever at a point more remote from the pivot of said lever than the point of connection of the lever with the tool spindle, means carried by the rod for moving the yoke member to operate the die, and means for rocking the lever to effect movement of the tool spindle and operation of the die.

11. The method of cutting threads on both ends of a nipple or the like, which comprises gripping one end of the work in a chuck, bringing the work into registry with a threading tool and threading the projecting end of the work, moving the work and threading tool out of registry, bringing the work into registry with a die-head provided with chasers which are movable to and from operative position, moving the die-head over the projecting end of the work while the chasers are in inoperative position, moving the chasers to operative position and producing simultaneous relative rotation and longitudinal movement between the chasers and work to effect the threading of the part beyond the projecting end.

12. The method of threading a rod or the like, which comprises gripping one end of the work in a chuck, producing relative rotary and longitudinal movement between the work and a die-head provided with chasers, while maintaining the chasers in inoperative position until the chasers have passed beyond the projecting end of the work, moving the chasers to operative position and reversing the direction of the relative longitudinal movement while continuing the rotary movement to effect the threading operation, moving the chasers out of operative position after a predetermined number of threads have been cut and short of the projecting end of the rod.

13. The method of threading an intermediate portion of a rod or the like which comprises gripping one end of the work in a chuck, moving a die-head which is provided with chasers over the projecting end of the work to a point beyond the portion to be threaded, while maintaining the chasers in inoperative position, moving the chasers to operative position and then moving the chasers longitudinally of the work in the reverse direction while effecting relative rotary movement between the chasers and the work to effect the threading operation and then moving the chasers out of operative position before the end of the work is reached.

EARL W. BRINKMAN.